J. R. KINERSON.
Butter-Print.
No. 215,633. Patented May 20, 1879.
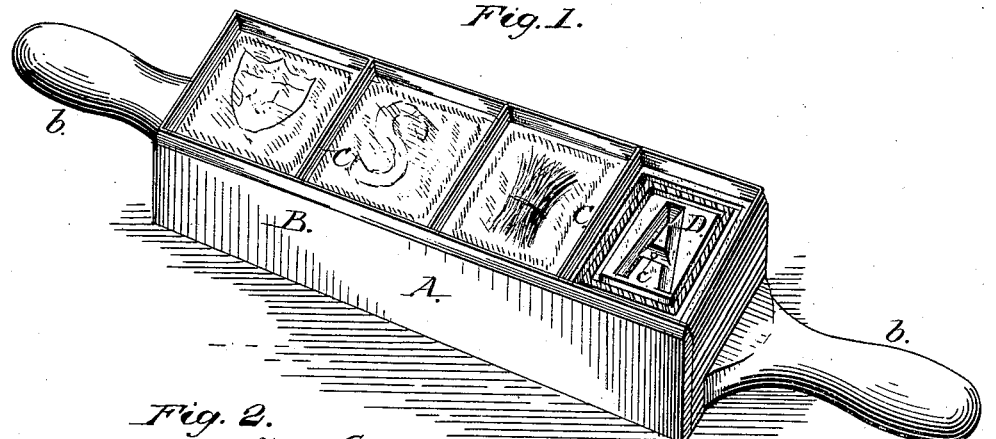
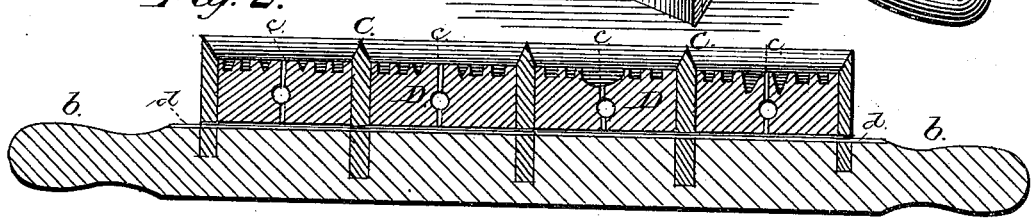
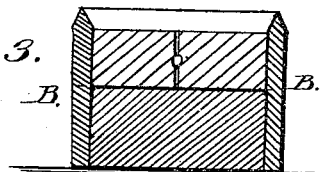
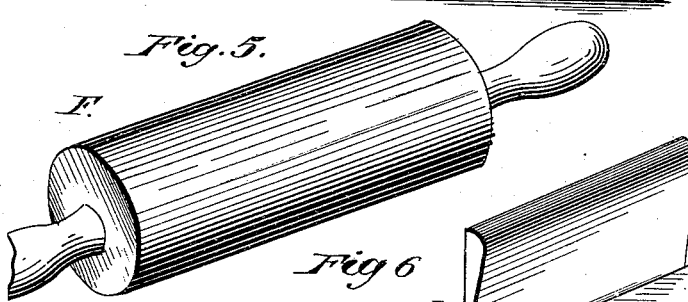
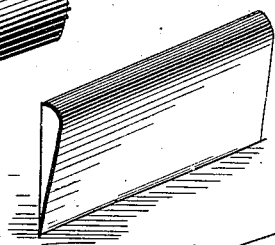
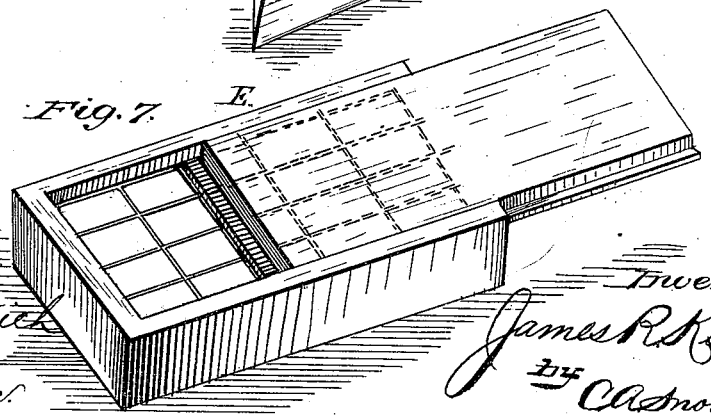
Witnesses:
Fred G. Dieterich
J. Walter Fowler
Inventor:
James R. Kinerson
by C. A. Snow & Co.
Atty's

UNITED STATES PATENT OFFICE.

JAMES R. KINERSON, OF PEACHAM, VERMONT.

IMPROVEMENT IN BUTTER-PRINTS.

Specification forming part of Letters Patent No. 215,633, dated May 20, 1879; application filed March 12, 1879.

*To all whom it may concern:*

Be it known that I, JAMES R. KINERSON, of Peacham, in the county of Caledonia and State of Vermont, have invented certain new and useful Improvements in Packing and Printing Butter; and I do hereby declare that the following is a full, clear, and exact description of the invention, which will enable others skilled in the art to which it appertains to make and use the same, reference being had to the accompanying drawings, which form a part of this specification.

Figure 1 is a perspective view of my improved butter-printer. Fig. 2 is a longitudinal section of the same. Fig. 3 is a cross-section. Figs. 4, 5, and 6 are perspective views, representing, respectively, the implements for tamping, rolling or smoothing, and cutting the butter; and Fig. 7 is a perspective view of a box of butter prepared for market.

This invention relates to molds or devices for printing butter; and it consists in the improved construction of the same, which will be hereinafter fully described, and particularly pointed out in the claim.

In the drawings, A represents the printing implement, which consists of a frame, B, having handles b b, and provided with a number of sharp-edged recesses, C, adapted to receive the print-blocks D, which are engraved with any suitable designs or monograms, and are held securely in the frame by means of screws or other suitable means. Channels or grooves c c extend from the faces of the print-blocks through said blocks, and terminate at a channel or groove, d, which extends longitudinally through the frame, and is provided with openings for the escape of the whey which enters at the openings in the faces of the print-blocks.

In carrying out my invention, I pack the butter in a shallow box, E, made of exact size to hold a given quantity—say ten or twenty pounds—of butter. This is first successively tamped or compressed and rolled or smoothed with the implements F G, (shown in Figs. 4 and 5 of the drawings,) the former, which is the roller, being adapted to fit between the sides of the box, so as to exert an equal pressure over the entire surface.

The frame of the printing implement is of such a length as to fit exactly between the sides of the box. The width of said frame and the number of print-blocks contained therein may be so varied as to make each print or impression of any desired weight. For instance, if the box contains twenty pounds of butter the frame may be made to contain four print-blocks, and the width of the frame be proportioned to the length of the box as 1 to 5. This will make twenty single prints or impressions, which, when equally separated, will be each of one pound weight. Larger or smaller prints may be made, and the number of prints contained in the box may be varied, without changing the nature of my invention.

To separate the prints, the flat sharp-edged wooden knife shown in Fig. 6 may be successfully used, said knife being adapted to fit between the sides of the box.

Having thus described my invention, I claim and desire to secure by Letters Patent of the United States—

As an improvement in implements for printing butter, the frame B, having sharp-edged recesses C C and groove d, in combination with the print-blocks D D, having channels c c, substantially as and for the purpose set forth.

In testimony that I claim the foregoing as my own I have hereto affixed my signature in presence of two witnesses.

JAMES RICHARDSON KINERSON.

Witnesses:
   WILLIAM H. COWLES,
   MARTIN S. HIDDEN.